(12) United States Patent
Ninagawa

(10) Patent No.: US 10,936,923 B2
(45) Date of Patent: Mar. 2, 2021

(54) IMAGE FORMING APPARATUS THAT DEGRADES VISIBILITY OF PRINTED SIDE OF USED PAPER

(71) Applicant: KYOCERA Document Solutions Inc., Osaka (JP)

(72) Inventor: Takayasu Ninagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/773,703

(22) Filed: Jan. 27, 2020

(65) Prior Publication Data
US 2020/0242431 A1 Jul. 30, 2020

(30) Foreign Application Priority Data
Jan. 28, 2019 (JP) .............................. JP2019-012460
May 23, 2019 (JP) .............................. JP2019-096522

(51) Int. Cl.
*G06K 15/02* (2006.01)
*H04N 1/32* (2006.01)

(52) U.S. Cl.
CPC ..... *G06K 15/1889* (2013.01); *G06K 15/1872* (2013.01); *H04N 1/32208* (2013.01); *H04N 1/32219* (2013.01); *H04N 1/32229* (2013.01)

(58) Field of Classification Search
None
See application file for complete search history.

(56) References Cited

U.S. PATENT DOCUMENTS

| 5,666,191 A | * | 9/1997 | Hasegawa | ................ B41M 7/00 |
| | | | | 399/366 |
| 10,158,770 B1 | * | 12/2018 | Yamaki | ................ H04N 1/2104 |
| 2008/0320604 A1 | * | 12/2008 | Nakajima | .......... H04N 1/00872 |
| | | | | 726/28 |
| 2010/0134840 A1 | * | 6/2010 | Abe | ...................... G06F 40/186 |
| | | | | 358/1.15 |
| 2011/0199625 A1 | * | 8/2011 | Sugimoto | .......... H04N 1/32133 |
| | | | | 358/1.9 |
| 2017/0064112 A1 | * | 3/2017 | Kobayashi | ......... H04N 1/00366 |

FOREIGN PATENT DOCUMENTS

JP 2010276771 A 12/2010

* cited by examiner

*Primary Examiner* — Miya J Williams
(74) *Attorney, Agent, or Firm* — Alleman Hall Creasman & Tuttle LLP

(57) ABSTRACT

An image forming apparatus includes an image forming portion, an image reading portion, an analysis processing portion, a generation processing portion, and a printing processing portion. The image forming portion forms an image on a paper sheet. The image reading portion reads a first image from a printed side of a used paper sheet supplied from a sheet feed portion. The analysis processing portion analyzes content of the first image read by the image reading portion. The generation processing portion generates, based on the content of the first image analyzed by the analysis processing portion, a second image that degrades visibility of the first image when the second image is superimposed on the first image. The printing processing portion causes the image forming portion to execute a printing process such that the second image generated by the generation processing portion is superimposed on the first image on the printed side.

11 Claims, 13 Drawing Sheets

FIG. 3

| TARGET IMAGE | CANDIDATE IMAGE |
|---|---|
| A | E |
|  | H |
|  | M |
| B | E |
|  | G |
|  | W |
| C | O |
|  | S |
| ... | ... |
| Z | K |
|  | W |
|  | B |
| ☆ | ☆ |
|  | ☆ |
| △ | ▽ |
|  | ✖ |
| ... | ... |

D1

_(54)_ IMAGE FORMING APPARATUS THAT DEGRADES VISIBILITY OF PRINTED SIDE OF USED PAPER

INCORPORATION BY REFERENCE

This application is based upon and claims the benefit of priority from the corresponding Japanese Patent Applications No. 2019-012460 filed on Jan. 28, 2019, and No. 2019-096522 filed on May 23, 2019, the entire contents of which are incorporated herein by reference.

BACKGROUND

The present disclosure relates to an image forming apparatus and an image forming method for reading image data from a document sheet and forming an image on a paper sheet.

In an image forming apparatus such as a printer, a multi-function printer, and an MFP Multifunction Peripheral), used paper sheets may be used from the viewpoint of resource saving. In this case, if paper sheets on which important information is printed are used as the used paper sheets, the important information, such as personal information, company secret information, or privileged information, may be leaked outside. There is known a method of printing predetermined dummy data over the important information to prevent leakage of the information.

SUMMARY

An image forming apparatus according to an aspect of the present disclosure includes an image forming portion, an image reading portion, an analysis processing portion, a generation processing portion, and a printing processing portion. The image forming portion forms an image on a paper sheet. The image reading portion reads a first image from a printed side of a used paper sheet supplied from a sheet feed portion. The analysis processing portion analyzes content of the first image read by the image reading portion. The generation processing portion generates a second image based on the content of the first image analyzed by the analysis processing portion, the second image degrading visibility of the first image when the second image is superimposed on the first image. The printing processing portion causes the image forming portion to execute a printing process such that the second image generated by the generation processing portion is superimposed on the first image on the printed side.

An image forming method according to another aspect of the present disclosure includes an analysis step, a generation step, and a printing step. In the analysis step, content of a first image is analyzed, wherein the first image is read by an image reading portion from a printed side of a used paper sheet supplied from a sheet feed portion. In the generation step, a second image is generated based on the content of the first image analyzed in the analysis step, wherein the second image degrades visibility of the first image when the second image is superimposed on the first image. In the printing step, an image forming portion configured to form an image on a paper sheet is caused to execute a printing process such that the second image generated in the generation step is superimposed on the first image on the printed side.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram showing an example of image information used in the image forming apparatus according to the embodiment of the present disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

Figure 1:
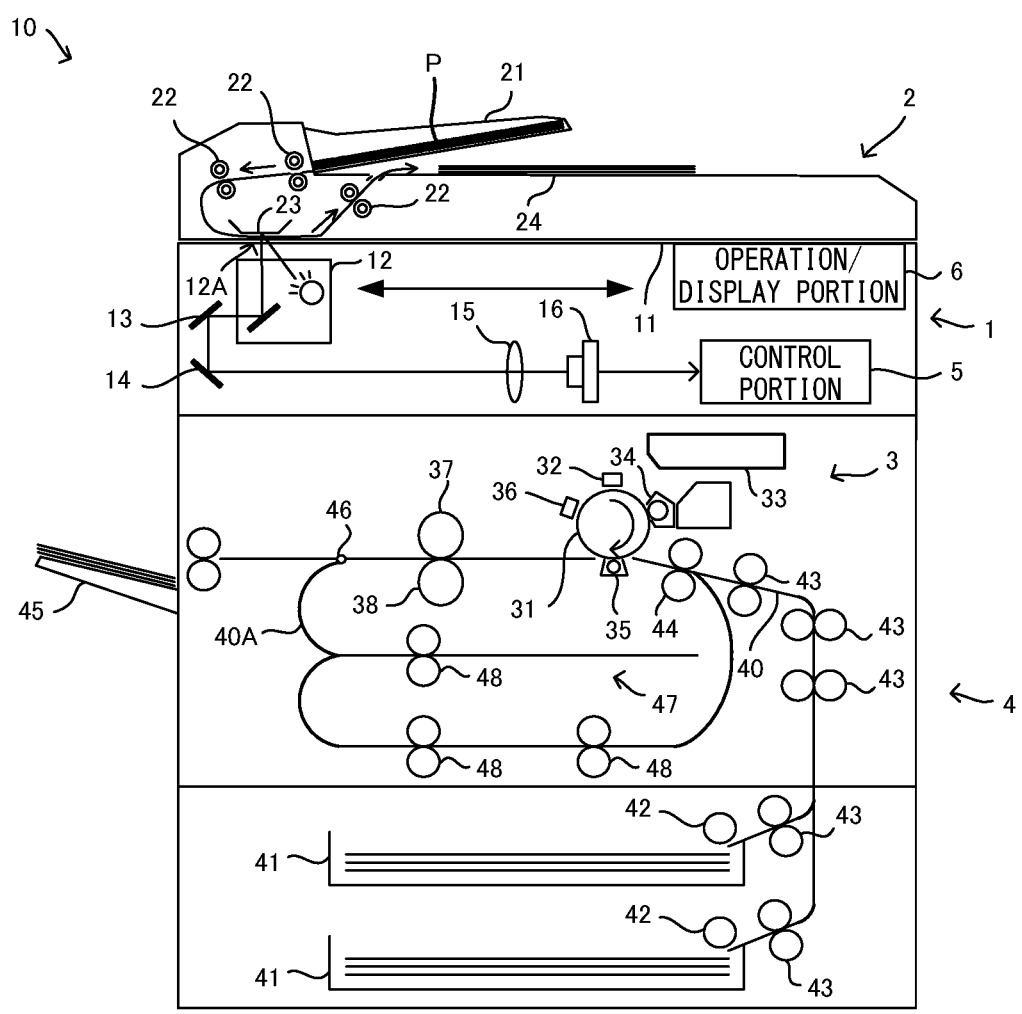
FIG. 1 is a schematic configuration diagram of an image forming apparatus according to an embodiment of the present disclosure.

As shown in FIG. 1, an image forming apparatus 10 includes an image reading portion 1, an ADF (Auto Document Feeder) 2, an image forming portion 3, a sheet feed portion 4, a control portion 5, and an operation/display portion 6. The image reading portion 1 includes a contact glass 11, a reading unit 12, mirrors 13 and 14, an optical lens 15, and a CCD (Charge Coupled Device) 16.

The ADF 2 is an automatic document sheet conveying device configured to convey a plurality of document sheets in sequence. The ADF 2 includes a document sheet setting portion 21, a plurality of conveyance rollers 22, a document sheet pressing 23, and a sheet discharge portion 24. The ADF 2 causes a motor (not shown) to drive the conveyance rollers 22 such that one or more document sheets P set on the document sheet setting portion 21 are conveyed to the sheet discharge portion 24 via a reading position 12A on the contact glass 11. During this process, the image reading portion 1 reads image data from the document sheets P passing the reading position 12A in sequence.

The image forming portion 3 is configured to form an image, by an electrophotographic method, on a paper sheet supplied from a sheet storage portion 41, based on image data read by the image reading portion 1, or based on image data input from an external information processing apparatus such as a personal computer. Specifically, the image forming portion 3 includes a photoconductor drum 31, a charging device 32, a used paper reading portion 33, a developing device 34, a transfer roller 35, an electricity removing device 36, a fixing roller 37, and a pressure roller 38. It is noted that the image forming portion 3 may form an image by an inkjet method.

The sheet feed portion 4 includes a sheet conveyance path 40, a re-conveyance path 40A, sheet storage portions 41, pickup rollers 42, conveyance rollers 43, registration rollers 44, a sheet discharge tray 45, a conveyance switching portion 46, a sheet reversing portion 47, and conveyance rollers 48. The sheet feed portion 4, controlled by the control portion 5, is configured to feed a paper sheet from the sheet storage portion 41, convey the paper sheet to pass through the image forming portion 3, and discharge the paper sheet to the sheet discharge tray 45.

The sheet conveyance path 40 extends from the sheet storage portions 41 to the sheet discharge tray 45 via the image forming portion 3. In the sheet conveyance path 40, paper sheets are conveyed by the conveyance rollers 43. The paper sheets stored in the sheet storage portion 41 are fed into the sheet conveyance path 40 in sequence by the pickup roller 42 that is driven by a drive motor (not shown).

The conveyance rollers 43 and the registration rollers 44 are connected to a drive motor (not shown) via a drive transmission portion such as a gear, wherein driving of the drive motor is controlled by the control portion 5. The conveyance rollers 43 are configured to convey a paper sheet in the sheet conveyance path 40 by being rotationally driven by the drive motor (not shown) in a state of holding the paper sheet therebetween. The registration rollers 44 are provided upstream of the image forming portion 3 in the paper sheet conveyance direction. The registration rollers 44 are connected to the drive transmission portion via a clutch or the like that can control rotation and stop, and configured to switch between conveying and stopping a paper sheet in the sheet conveyance path 40.

Specifically, when an image forming process (including a used paper printing process described below) is started, the control portion 5 controls the pickup rollers 42 and the conveyance rollers 43 to move a paper sheet from the sheet storage portion 41 to the registration rollers 44. After the paper sheet reaches the registration rollers 44, the control portion 5 stops the registration rollers 44. Thereafter, when it becomes possible to perform the image forming process based on image data, the control portion 5 starts driving the registration rollers 44 to resume the conveyance of the paper sheet, and starts forming an electrostatic latent image on the photoconductor drum 31 so that an image is formed on the paper sheet based on the image data.

In addition, the control portion 5 is configured to execute a continuous copy process of reading image data from document sheets conveyed in sequence by the ADF 2 and executing the image forming process based on the image data.

The conveyance switching portion 46 switches the destination of the paper sheet conveyed in the sheet conveyance path 40 either to the sheet discharge tray 45 or to the re-conveyance path 40A. The conveyance switching portion 46 includes, for example, a drive portion and a switch claw, wherein the drive portion is a solenoid or the like, and driving of the drive portion is controlled by the control portion 5. The switch claw is activated by the drive portion so as to switch the destination of the paper sheet conveyed in the sheet conveyance path 40 either to the sheet discharge tray 45 or to the re-conveyance path 40A.

In the re-conveyance path 40A, a paper sheet with an image formed on one side thereof by the image forming portion 3 is re-conveyed toward the image forming portion 3. In addition, at least one paper sheet of the largest size that can be used in the image forming apparatus 10 can be stored in the re-conveyance path 40A, without overlapping with the sheet conveyance path 40.

The sheet reversing portion 47 is configured to reverse the front and rear sides of a paper sheet conveyed in the re-conveyance path 40A. The image forming apparatus 10 is configured to execute a double-side printing in which after the image forming portion 3 forms an image on one side of a paper sheet, the front and rear sides of the paper sheet is reversed, the paper sheet is re-conveyed to the image forming portion 3, and the image forming portion 3 forms an image on the other side of the paper sheet. It is noted that front and rear sides of a paper sheet may not be reversed when the paper sheet is re-conveyed in the re-conveyance path 40A to the image forming portion 3.

A storage portion 7 is a nonvolatile storage portion such as a hard disk or an EEPROM. The storage portion 7 stores various data and various control programs such as an image formation program that causes the control portion 5 to execute the used paper printing process (see FIG. 7) that is described below.

The storage portion 7 also stores image information D1. FIG. 3 shows a database as an example of the image information D1. In the image information D1, a plurality of target images are stored, each in association with one or more candidate images. The target images are standardized images representing letters, signs, figures or the like. That is, the target images are images that can be recognized as letters, signs, figures or the like. Specifically, the target images are Japanese hiragana letters, Japanese katakana letters, Chinese letters, alphabets, signs, figures or the like. The target images correspond to images included in a used paper image formed on a printed side of a used paper sheet. The target images are an example of information of the first image of the present disclosure. The candidate images are an example of information of the second image of the present disclosure.

The candidate images may be the standardized images, or non-standardized images that cannot be recognized as letters, signs, figures or the like. The candidate images correspond to images included in a superimposition image to be printed over the used paper image on the printed side of the used paper sheet. In addition, the candidate images, when they are superimposed as the superimposition image on the used paper image, degrade the visibility of the used paper image or make it unrecognizable. It is noted that the visibility of the used paper image with the superimposition image printed thereon may be determined by a human visual determination or by an OCR (Optical Character Recognition) analysis. In the image information D1, a plurality of target images may be stored, each in association with one candidate image or a plurality of candidate images. In a case where each target image is associated with a plurality of candidate images, the control portion 5 may set priorities to the candidate images for each target image. For example, the control portion 5 sets priorities to the candidate images such that the lower the visibility of a corresponding target image with the candidate image printed thereon is, the higher the priority of the candidate image is.

The control portion 5 includes control equipment such as a CPU, a ROM, and a RAM. The CPU is a processor that executes various calculation processes. The ROM is a nonvolatile storage portion in which various information such as control programs for causing the CPU to execute various processes are stored in advance. The RAM is a volatile or nonvolatile storage portion that is used as a temporary storage memory (working area) for the various processes executed by the CPU.

Meanwhile, in an image forming apparatus, to prevent leakage of information from an image printed on the printed side of a used paper sheet, the image may be filled with a black solid pattern. However, the method shall increase the use amount of toner. On the other hand, the image forming apparatus 10 according to the present embodiment is configured to prevent leakage of information from an image formed on a used paper sheet without increasing the use amount of toner.

Figure 2:
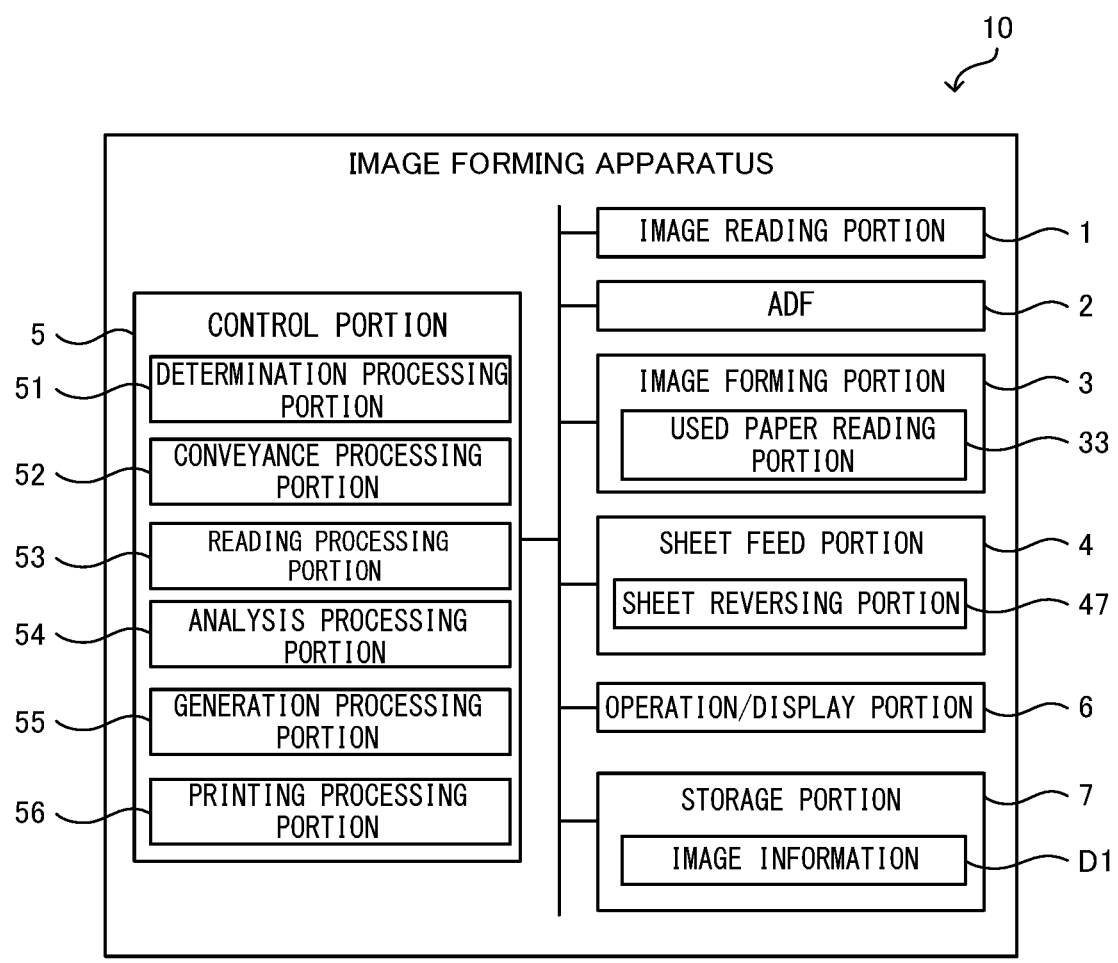
FIG. 2 is a functional block diagram showing a configuration of the image forming apparatus according to the embodiment of the present disclosure.

Specifically, as shown in FIG. 2, the control portion 5 includes a determination processing portion 51, a conveyance processing portion 52, a reading processing portion 53, an analysis processing portion 54, a generation processing portion 55, and a printing processing portion 56. The control portion 5 functions as the determination processing portion 51, the conveyance processing portion 52, the reading processing portion 53, the analysis processing portion 54, the generation processing portion 55, and the printing processing portion 56 when it causes the CPU to execute processes according to the programs stored in the ROM. It is noted that one or more of the determination processing portion 51, the conveyance processing portion 52, the reading processing portion 53, the analysis processing portion 54, the generation processing portion 55, and the printing processing portion 56 may be an electronic circuit such as ASIC.

The determination processing portion 51 determines whether or not printing on used paper sheet has been specified on the operation/display portion 6. For example, the user can select "used paper printing mode" on a printing mode setting screen displayed on the operation/display portion 6, with the other option being "normal printing mode". It is noted that on a first side (printed side) of a used paper sheet, a used paper image including images of letters or figures is formed, and no image is formed on a second side (unused side) of the used paper sheet.

When the used paper printing is specified, the conveyance processing portion 52 conveys used paper sheets from one of the sheet storage portions 41 in which the used paper sheets are stored. The used paper sheets are fed in sequence to the sheet conveyance path 40 by the pickup rollers 42 driven by a drive motor.

The reading processing portion 53 causes the used paper reading portion 33 to execute a reading process to read a used paper image from the printed side of a used paper sheet. The used paper reading portion 33 is an image reading portion configured to read the used paper image from the printed side of the used paper sheet supplied from the sheet feed portion 4, and is an example of an image reading portion of the present disclosure. The used paper image is an example of a first image of the present disclosure. The used paper reading portion 33 is, for example, a scanner device. The reading processing portion 53 acquires the used paper image that was read by the used paper reading portion 33.

The analysis processing portion 54 analyzes the content of the used paper image read by the used paper reading portion 33. The analysis processing portion 54 is an example of an analysis processing portion of the present disclosure. Specifically, the analysis processing portion 54 performs an OCR analysis on the used paper image to recognize characters such as letters, signs, figures or the like. The analysis processing portion 54 may recognize the characters one by one, or recognize them in units of words, sentences, or paragraphs. In addition, the analysis processing portion 54 may recognize predetermined keywords (as personal information or the like).

The generation processing portion 55 executes an image generating process to generate a superimposition image based on the content of the used paper image analyzed by the analysis processing portion 54, wherein the superimposition image degrades visibility of a used paper image or makes it unrecognizable when the superimposition image is superimposed on the used paper image. The generation processing portion 55 is an example of a generation processing portion of the present disclosure. The superimposition image is an example of a second image of the present disclosure. Specifically, the generation processing portion 55 consults the image information D1 in the storage portion 7 to acquire candidate images in correspondence with target images included in the used paper image, and generates a superimposition image including the acquired candidate images.

In a case where the used paper image is composed of letters, the generation processing portion 55 generates a superimposition image that degrades the visibility of the letters when it is superimposed on the used paper image. For example, in a case where the analysis processing portion 54 recognizes a letter "A" by analyzing the used paper image, the generation processing portion 55 acquires a candidate letter "E" in correspondence with the letter "A", and generates a superimposition image including the letter "E". Here, with regard to the generated superimposition image, the generation processing portion 55 may set the size of the letter "E" the same as that of the letter "A" in the used paper image. In addition, the generation processing portion 55 may set the color of the letter "E" in the generated superimposition image the same as that of the letter "A" in the used paper image. Furthermore, the generation processing portion 55 may set the density of the letter "E" in the generated superimposition image the same as that of the letter "A" in the used paper image. In addition, the generation processing portion 55 may set the line width of the letter "E" in the generated superimposition image the same as that of the letter "A" in the used paper image. Furthermore, the generation processing portion 55 may set the font type of the letter "E" in the generated superimposition image the same as that of the letter "A" in the used paper image. That is, the generation processing portion 55 may generate a superimposition image including the acquired candidate images that are the same as the corresponding images in the used paper image in at least one of elements: size; color; density; line width; and font type.

Here, in a case where target images are each associated with a plurality of candidate images, when generating a superimposition image, the generation processing portion 55 may acquire one candidate image among the plurality of candidate images according to a predetermined condition, or acquire one candidate image in a random manner. For example, when the analysis processing portion 54 recognizes important information such as personal information in a used paper image, the generation processing portion 55 acquires a candidate image having a high priority among the plurality of candidate images for each target image, and generates a superimposition image including the acquired candidate images. On the other hand, when the analysis processing portion 54 does not recognize important information such as personal information in a used paper image, the generation processing portion 55 acquires a candidate image having a low priority among the plurality of candidate images for each target image, and generates a superimposition image including the acquired candidate images. When generating a superimposition image, the generation processing portion 55 may select one among the plurality of candidate images such that the higher the level of importance of the used paper image is, the higher the priority of the selected candidate images is. In this way, when generating a superimposition image, the generation processing portion 55 may acquire candidate images based on the level of importance of the content of the used paper image. It is noted that the level of importance is set based on the content, the ratio, or the number of pieces of important information such as personal information.

In addition, in a case where a plurality of same images are recognized by the analysis processing portion 54 in a used paper sheet, the generation processing portion 55 may acquire, in sequence, a plurality of different candidate images associated with a corresponding target image, and generates a superimposition image including the acquired candidate images. For example, when letters "A", "A", and "A" are recognized by the analysis processing portion 54, the generation processing portion 55 acquires candidate images "E", "H", and "M" in sequence from the image information D1 and generates a superimposition image including the candidate images "E", "H", and "M" at positions corresponding to the letters "A", "A", and "A". In this way, when a plurality of same images are included in a row in the printed side of a used paper image, it is preferable that a superimposition image including different images at positions corresponding to the adjacent images is generated.

In addition, in a case where a plurality of same images are recognized by the analysis processing portion 54 in a used paper sheet, the generation processing portion 55 may acquire candidate images based on the positions at which the plurality of same images are disposed, and generate a superimposition image including the acquired candidate images. For example, when two adjacent images "A" have another image therebetween in a used paper sheet, the generation processing portion 55 acquires two candidate images "E" in correspondence with the two images "A", and generates a superimposition image including the acquired candidate images "E" at positions corresponding to the images "A". On the other hand, when two images "A" are disposed in a row in a used paper sheet, the generation processing portion 55 acquires candidate images "E" and "H" in correspondence with the two images "A", and generates a superimposition image including the images "E" and "H" at positions corresponding to the adjacent images "A".

It is noted that the generation processing portion 55 preferably generates a superimposition image that does not degrade the visibility of an image formed on the unused side of a used paper sheet in a state where the superimposition image is printed over a used paper image on the printed side of the used paper sheet. For example, in a case where a target image is associated with a plurality of candidate images (see FIG. 3), the generation processing portion 55 acquires, for the target image, a candidate image that does not degrade the visibility of an image formed on the unused side of a used paper sheet in a state where the superimposition image is printed over a used paper image on the printed side of the used paper sheet, and generates the superimposition image including the acquired candidate image.

Figure 4:
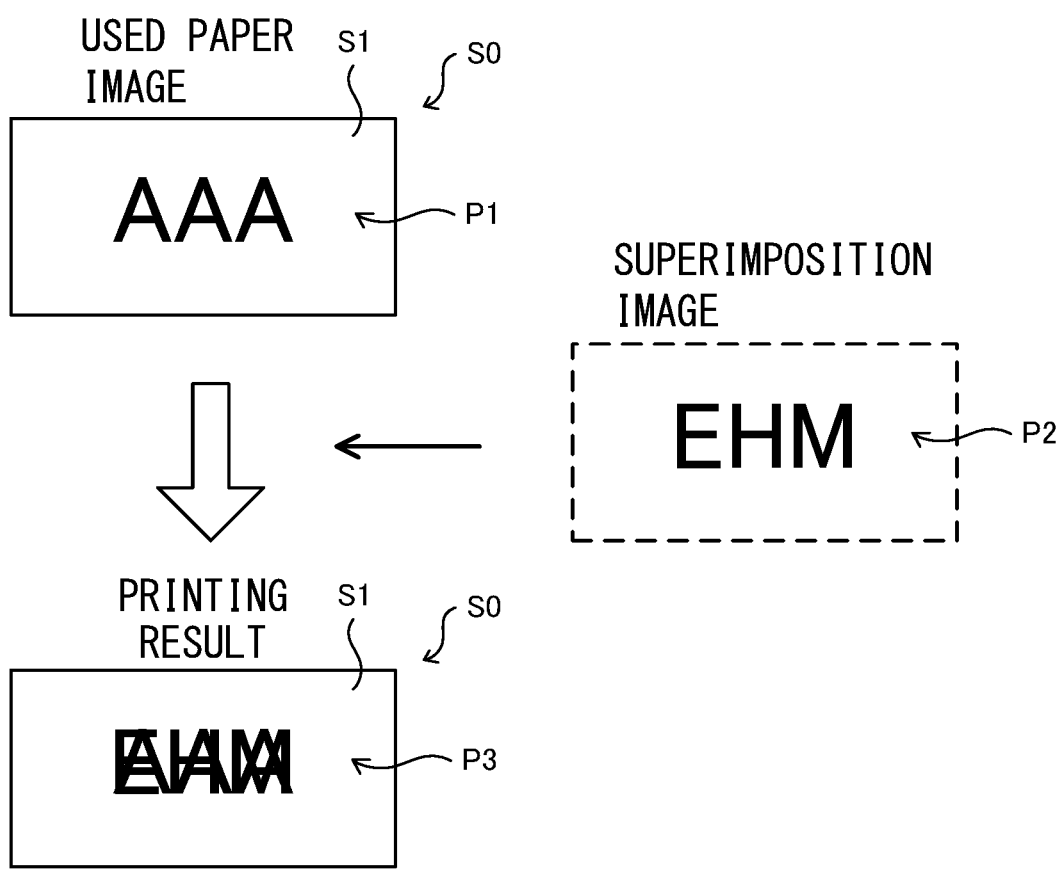
FIG. 4 is a diagram showing an example of a printing result obtained when a superimposition image is printed over a used paper image in the image forming apparatus according to the embodiment of the present disclosure.

The printing processing portion 56 causes the image forming portion 3 to execute a printing process such that a superimposition image generated by the generation processing portion 55 is superimposed on a used paper image on the printed side of a used paper sheet. The printing processing portion 56 is an example of a printing processing portion of the present disclosure. For example, as shown in FIG. 4, when a used paper image P1 is recognized by the analysis processing portion 54 on a printed side S1 of a used paper sheet S0, and the generation processing portion 55 generates a superimposition image P2, the printing processing portion 56 causes the image forming portion 3 to execute the printing process such that the superimposition image P2 is superimposed on the used paper image P1 on the printed side S1 of the used paper sheet S0. After the printing process is executed by the image forming portion 3, an image P3 shown in FIG. 4 is output.

Figure 5:
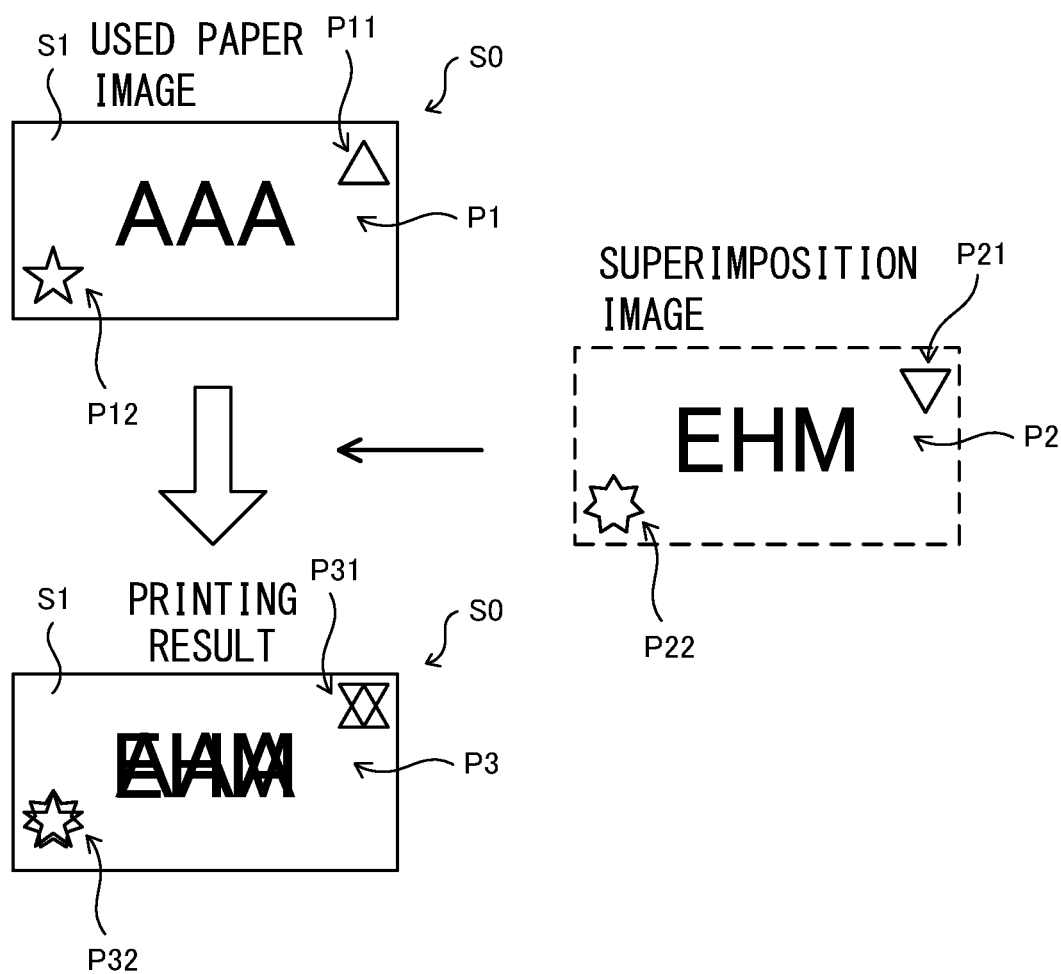
FIG. 5 is a diagram showing another example of a printing result obtained when a superimposition image is printed over a used paper image in the image forming apparatus according to the embodiment of the present disclosure.

In addition, for example, as shown in FIG. 5, when used paper images P11 and P12 representing figures are included in the printed side S1 of the used paper sheet S0, the printing processing portion 56 causes the image forming portion 3 to execute the printing process such that superimposition images P21 and P22 generated by the generation processing portion 55 are superimposed on the used paper images P11 and P12 on the printed side S1. After the printing process is executed by the image forming portion 3, images P31 and P32 shown in FIG. 5 are output.

Figure 6:
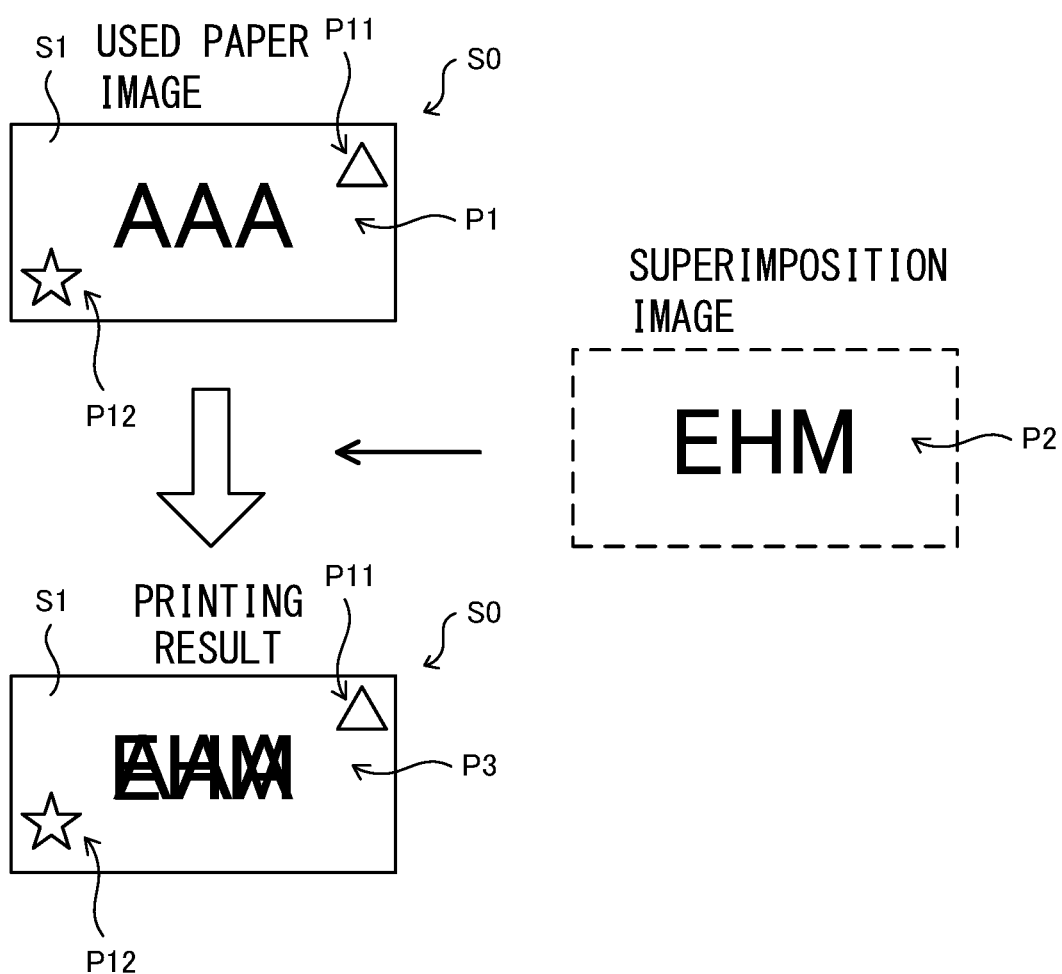
FIG. 6 is a diagram showing a further example of a printing result obtained when a superimposition image is printed over a used paper image in the image forming apparatus according to the embodiment of the present disclosure.

It is noted that when a used paper image includes an image that is not important and has a low possibility of information being leaked, the generation processing portion 55 may not generate a superimposition image for the image. For example, in a case where, as shown in FIG. 6, among a plurality of images included in the printed side S1 of the used paper sheet S0, the used paper image P1 of letters is important information, and used paper images P11 and P12 of figures are information having a low possibility of being leaked, the generation processing portion 55 generates the superimposition image P2 in correspondence with the used paper image P1 and generates no image in correspondence with the used paper images P11 and P12. In this case, after the printing process is executed by the image forming portion 3, images P3, P11, and P12 shown in FIG. 6 are output.

[Used Paper Printing Process]

Figure 7:
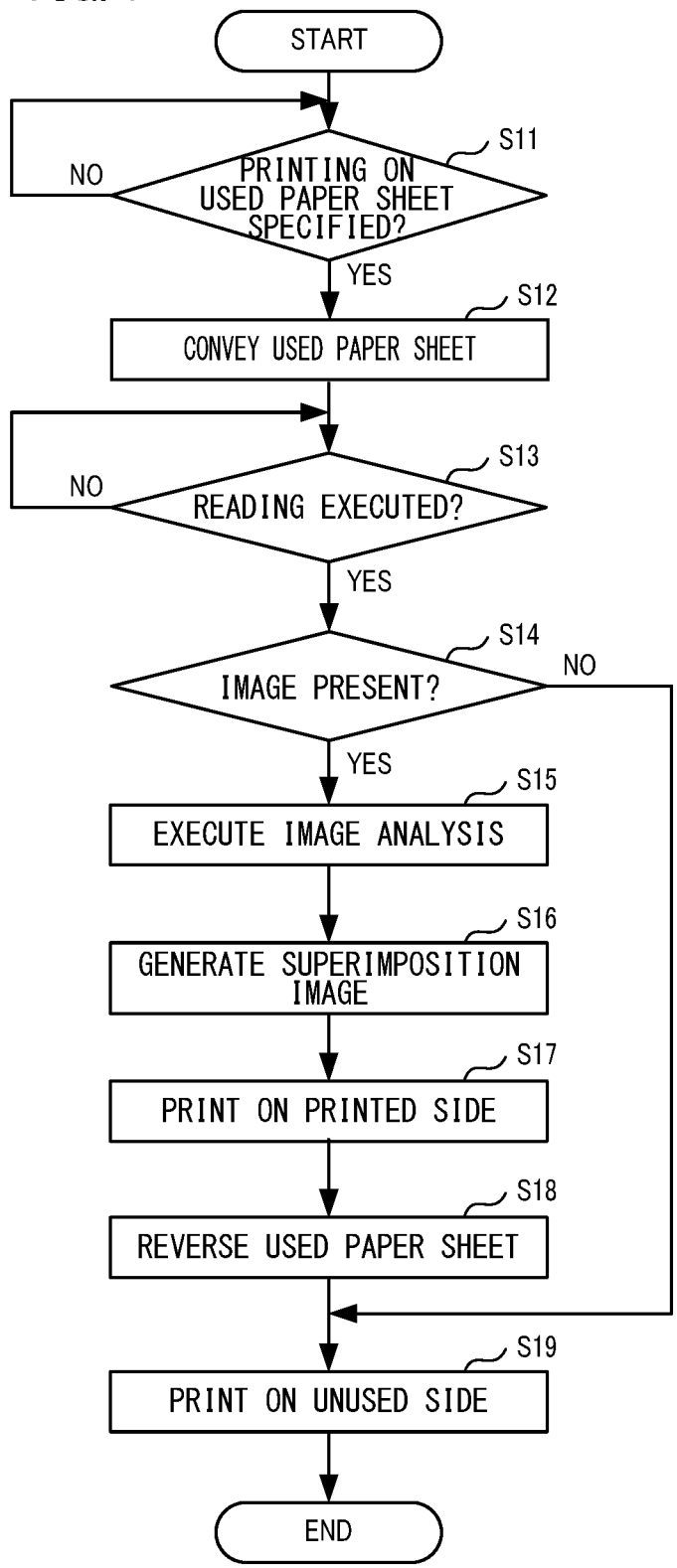
FIG. 7 is a flowchart showing an example of a procedure of a used paper printing process executed in the image forming apparatus according to the embodiment of the present disclosure.

The following describes an example of a procedure of the used paper printing process executed by the control portion 5 in the image forming apparatus 10, with reference to the flowchart of FIG. 7. Here, steps S11, S12, . . . represent numbers assigned to the processing procedures executed by the control portion 5. For example, when an image forming process is executed to form an image based on image data read from a document sheet conveyed by the ADF 2, the used paper printing process is executed together with the image forming process.

It is noted that one or more steps included in the used paper printing process described here may be omitted as appropriate. In addition, the steps constituting the used paper printing process may be executed in a different order as far as the same act and effect are produced. Furthermore, in the following description, the steps of the used paper printing process are executed by the control portion 5 of the image forming apparatus 10. However, in another embodiment, the steps of the used paper printing process may be executed by a plurality of other processors by distribution.

Here, the present disclosure can be considered as an invention of an image forming method in which one or more steps included in the used paper printing process are executed.

First, in step S11, the control portion 5 determines whether or not printing on a used paper sheet has been specified on the operation/display portion 6. The control portion 5 waits until printing on a used paper sheet is specified (S11: NO), and when printing on a used paper sheet is specified (S11: YES), moves the process to step S12.

Subsequently, in step S12, the control portion 5 drives the pickup rollers 42 by the drive motor to pick up used paper sheets from the sheet storage portions 41, and feed them in sequence to the sheet conveyance path 40.

Subsequently, in step S13, the control portion 5 causes the used paper reading portion 33 to execute the reading process to read a used paper image from the printed side of a used paper sheet, and determines whether or not the used paper reading portion 33 has executed the reading process. The control portion 5 waits until it determines that the used paper reading portion 33 has executed the reading process (S13: NO), and when it determines that the used paper reading portion 33 has executed the reading process (S13: YES), moves the process to step S14.

Subsequently, in step S14, the control portion 5 determines whether or not a used paper image is present on the printed side of the used paper sheet. For example, the control portion 5 determines whether or not a used paper image is present, based on image data read by the used paper reading portion 33. Upon determining that a used paper image is present on the printed side of the used paper sheet (S14: YES), the control portion 5 moves the process to step S15. On the other hand, upon determining that a used paper image is not present on the printed side of the used paper sheet (S14: NO), the control portion 5 moves the process to step S19.

Subsequently, in step S15, the control portion 5 analyzes the content of the used paper image read by the used paper reading portion 33. Specifically, the control portion 5 performs an OCR analysis on the used paper image to recognize letters, signs, figures or the like. Step S15 is an example of an analysis step of the present disclosure.

Subsequently, in step S16, the control portion 5 executes an image generating process to generate a superimposition image based on the recognized content of the used paper image, wherein the superimposition image is an image to be superimposed on the used paper image. Specifically, the control portion 5 consults the image information D1 (see FIG. 3) stored in the storage portion 7 to acquire a predetermined candidate image among one or more candidate images associated with a target image included in the used paper image. Step S16 is an example of a generation step of the present disclosure.

Subsequently, in step S17, the control portion 5 causes the image forming portion 3 to execute the printing process to superimpose the superimposition image on the used paper image on the printed side of the used paper sheet. This allows a printing result, such as the one shown in FIG. 4, to be output. Step S17 is an example of a printing step of the present disclosure.

Subsequently, in step S18, the control portion 5 causes the sheet reversing portion 47 to reverse the front and rear sides (the first and second sides) of the used paper sheet conveyed in the re-conveyance path 40A, and re-convey the used paper sheet to the image forming portion 3.

Subsequently, in step S19, the control portion 5 executes the printing process such that an image is formed on the unused side of the used paper sheet based on the image data read by the image reading portion 1.

As described above, the image forming apparatus 10 according to the present embodiment degrades visibility of a used paper image on a printed side of a used paper sheet by printing a superimposition image over the used paper image, wherein the superimposition image is generated in correspondence with the content of the used paper image, thereby preventing leakage of information. That is, according to the image forming apparatus 10, there is no need to fill the used paper image with a black solid pattern in order to prevent information leakage. Accordingly, the image forming apparatus 10 restricts increase of toner use amount. As a result, according to the image forming apparatus 10, it is possible to prevent leakage of information from a used paper image formed on a used paper sheet, without increasing toner use amount. In addition, the image forming apparatus 10 is configured to print different superimposition images on adjacent used paper images. Accordingly, for example, when the printed side of a used paper sheet includes used paper images of a same letter in a row, it is possible to degrade visibility of the adjacent used paper images by printing different superimposition images thereon.

The image forming apparatus of the present disclosure is not limited to the one described in the embodiment above. For example, the image forming apparatus 10 may form a superimposition image in correspondence with a part of a plurality of used paper images included in the printed side of a used paper sheet. For example, in a case where the printed side includes first, second, and third used paper images, and a meaning is established only when the first, second, and third used paper images are combined together, the image forming apparatus 10 may generate a superimposition image only for the second used paper image, if printing the superimposition image over the second used paper image makes it difficult to establish the meaning. That is, the image forming apparatus 10 does not need to form superimposition images in correspondence with all of a plurality of used paper images included in the printed side of a used paper sheet, but may generate a superimposition image in correspondence with at least a part of the used paper images, based on the content, positions or the like of the used paper images.

In addition, in the above-described embodiment, a superimposition image includes images that are determined based on the content of the characters, such as letters, signs, or figures, included in a used paper image. However, the present disclosure is not limited to this configuration. For example, the generation processing portion 55 may generate a superimposition image in which images of a predetermined pattern set in advance are used. Specifically, the generation processing portion 55 generates a superimposition image including images of a predetermined pattern that is the same as images included in the corresponding used paper image in at least one of elements such as size, color, density, line width, and font type. For example, when an image "×" is used as the pattern image, the generation processing portion 55 generates a shared image composed of images "×" of a same color as the characters included in the corresponding used paper image. In this way, the generation processing portion 55 generates a superimposition image based on the content of the a used paper image analyzed by the analysis processing portion 54. In addition, the content of a used paper image includes at least one of elements such as size, color, density, line width, and font type.

Figure 8:
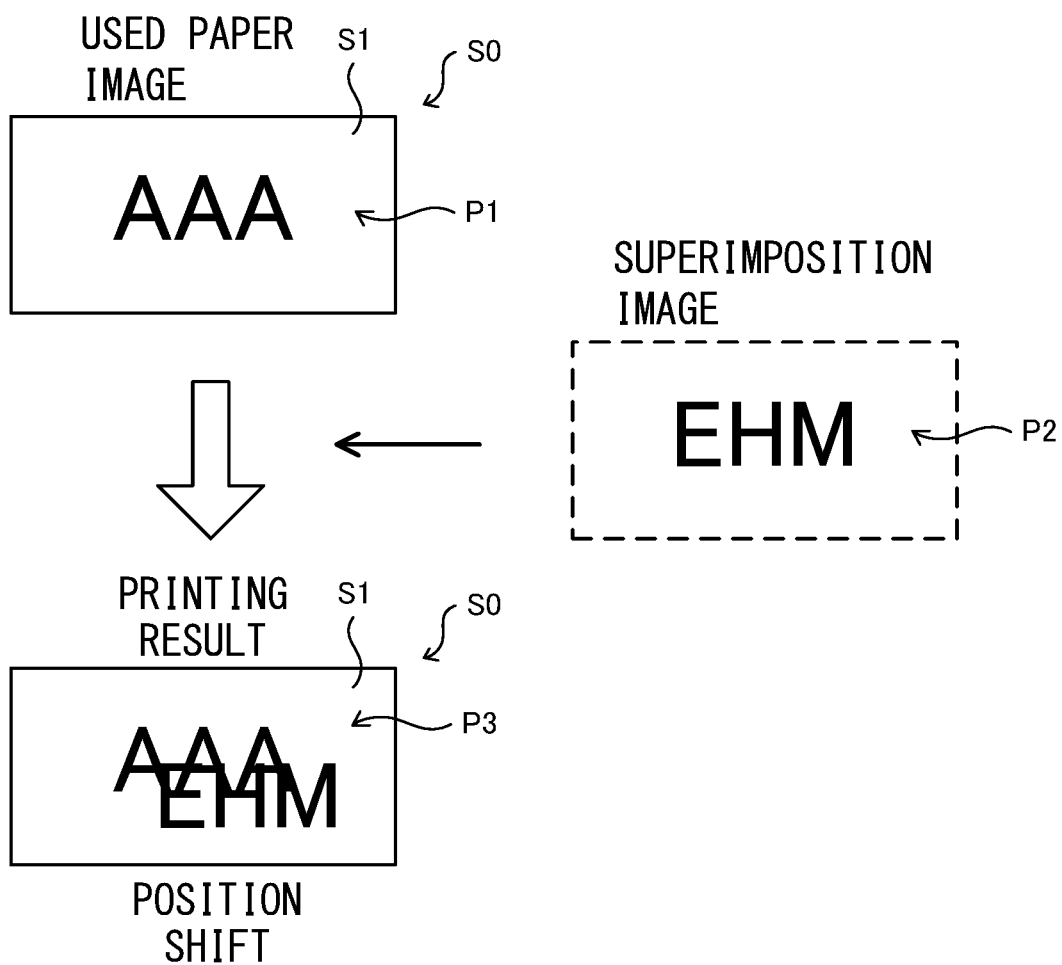
FIG. 8 is a diagram showing a still further example of a printing result obtained when a superimposition image is printed over a used paper image in the image forming apparatus according to the embodiment of the present disclosure.

Meanwhile, a position shift (print shift) may occur when a printing process is executed to superimpose a superimposition image on a used paper image. When such a position shift occurs, as shown in FIG. 8, the used paper image P1 may not be concealed completely, and information may be leaked. The position shift may occur due to an individual difference such as a manufacturing error of the image forming apparatus 10 or a conveying error of a document sheet. In order to prevent leakage of information due to the position shift, the image forming apparatus 10 may further execute a correction process to correct the position shift.

Figure 9:
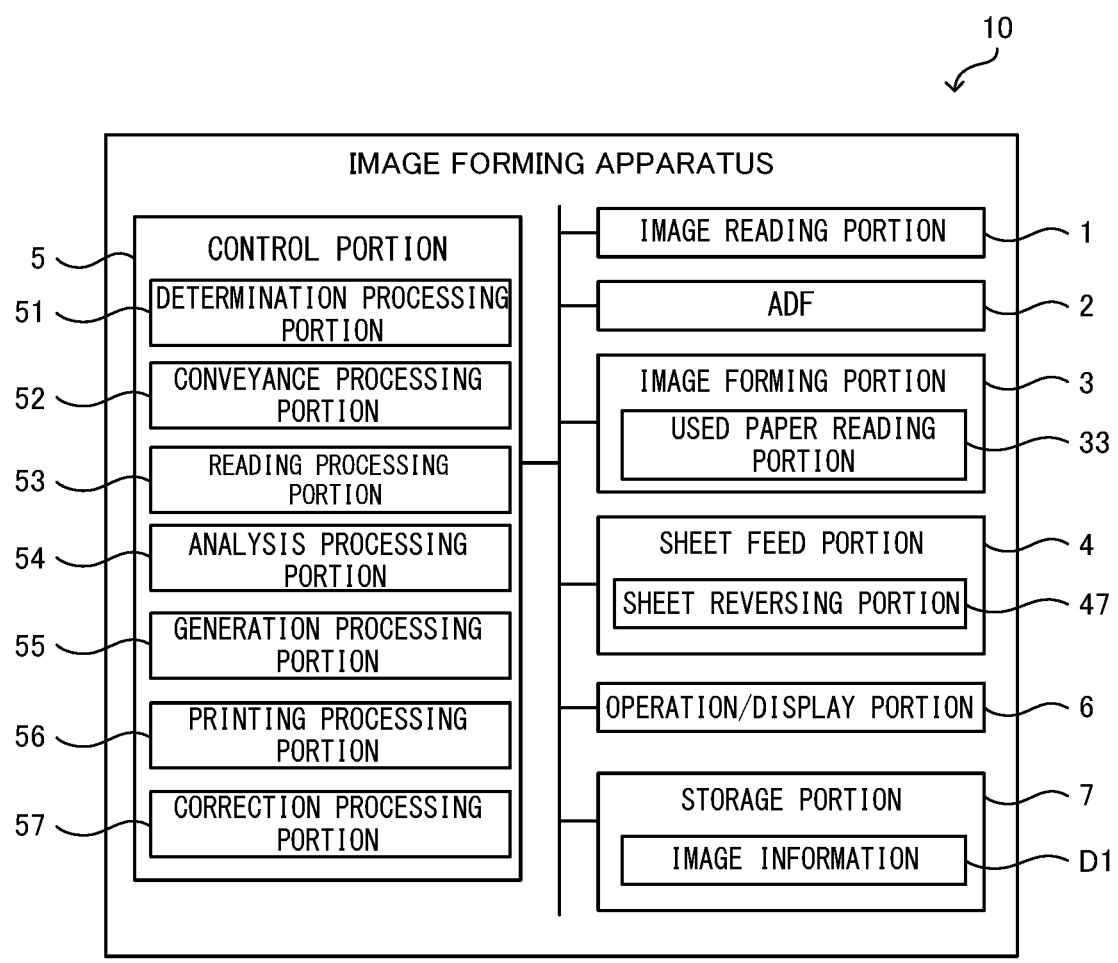
FIG. 9 is a functional block diagram showing another configuration of the image forming apparatus according to the embodiment of the present disclosure.

Specifically, as shown in FIG. 9, in the image forming apparatus 10, the control portion 5 further includes a correction processing portion 57. The following describes a correction process executed by the control portion 5, with reference to a specific example shown in FIG. 10.

The reading processing portion 53 causes the used paper reading portion 33 to execute a reading process to read the used paper image P1 from the printed side 51 of the used paper sheet S0. The analysis processing portion 54 analyzes the content of the used paper image P1 read by the used paper reading portion 33.

The generation processing portion 55 executes an image generating process to generate a superimposition image based on the content of the used paper image P1 analyzed by the analysis processing portion 54, wherein the superimposition image degrades the visibility of the used paper image P1 or makes it unrecognizable when the superimposition image is superimposed on the used paper image P1. Although in FIG. 10, the superimposition image includes rectangular mages filled with a black solid pattern, in the actuality, the generation processing portion 55 consults the image information D1 (see FIG. 3) in the storage portion 7 to acquire candidate images associated with corresponding target images included in the used paper image P1, and generates a superimposition image including the acquired candidate images.

Figure 10:
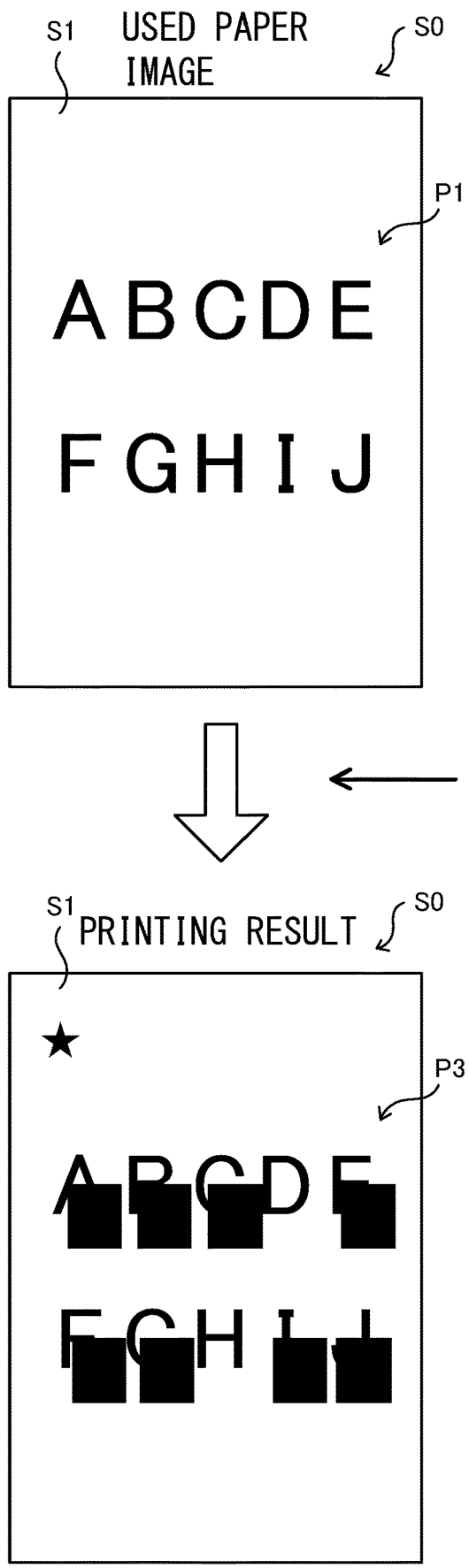
FIG. 10 is a diagram showing a still further example of a printing result obtained when a superimposition image is printed over a used paper image in the image forming apparatus according to the embodiment of the present disclosure.
Figure 10:
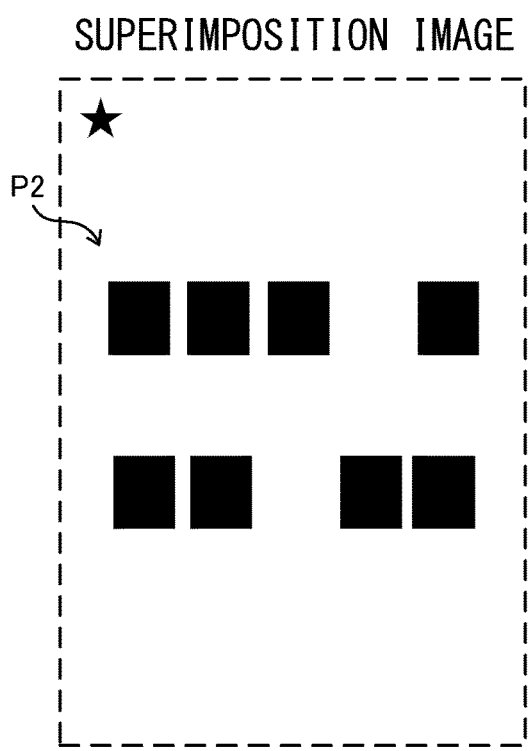

In addition, the generation processing portion 55 generates a superimposition image P2 such that at least one specific letter among a plurality of letters included in the used paper image P1 is not superimposed by the superimposition image P2. For example, the generation processing portion 55 does not acquire a candidate image in correspondence with at least one specific letter among the letters included in the used paper image P1, and instead, generates a blank area (non-superimposition area) in correspondence with the at least one specific letter. In the example shown in FIG. 10, the generation processing portion 55 generates the superimposition image P2 that includes blank areas in correspondence with a letter "D" (a first specific letter) and a letter "H" (a second specific letter) among a plurality of letters included in the used paper image P1. The specific letter is, for example, a letter which itself is difficult to be recognized. Furthermore, the generation processing portion 55 generates a specific image at a predetermined position that is not superimposed on the used paper image P1. For example, as shown in FIG. 10, the generation processing portion 55 generates a superimposition image P2 that includes a black star mark at the upper left corner thereof as a specific image. It is noted that the generation processing portion 55 does not generate a superimposition image in correspondence with the specific image. In this way, the generation processing portion 55 generates the specific image at a predetermined position that is not superimposed on the used paper image P1, the predetermined position being separated from the superimposition image P2 by a predetermined distance.

Figure 11:
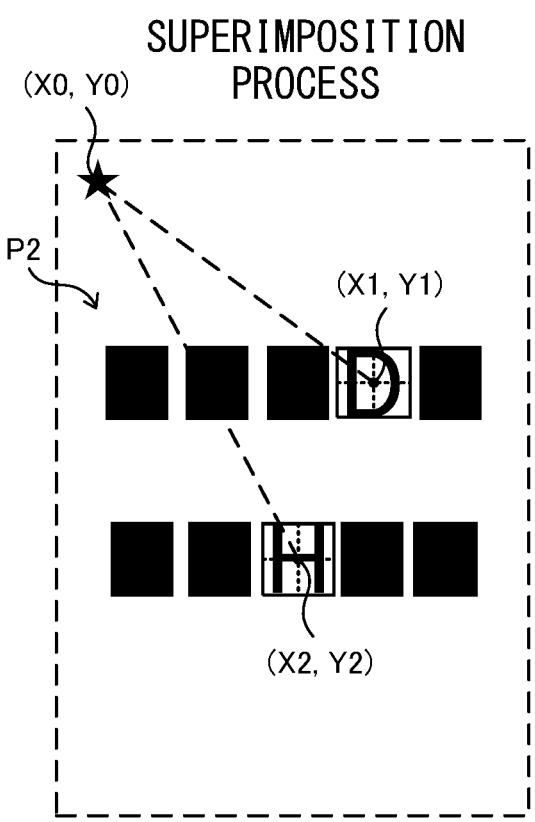
FIG. 11 is a diagram showing a state where a process of overlaying a superimposition image on a used paper image has been executed in the image forming apparatus according to the embodiment of the present disclosure.

The correction processing portion 57 detects a relative position of the specific letter to the specific image. Specifically, as shown in FIG. 11, the correction processing portion 57 performs an internal process to virtually perform a superimposition process to superimpose the superimposition image P2 on the used paper image P1, and detect position coordinates (X1, Y1) of the first specific letter "D" and position coordinates (X2, Y2) of the second specific letter "H" using position coordinates (X0, Y0) of the specific image as a reference. It is noted that the position coordinates are position coordinates of the center of the specific image, and position coordinates of the center of the specific letter.

The printing processing portion 56 causes the image forming portion 3 to execute a printing process to superimpose a superimposition image P2 generated by the generation processing portion 55 on a used paper image P1 in a printed side 51 of a used paper sheet S0. Subsequently, the reading processing portion 53 causes the used paper reading portion 33 to execute a reading process to read a print image P3 that is a result of superimposing the superimposition image P2 on the used paper image P1. That is, the reading processing portion 53 executes a reading process and a re-reading process, wherein in the reading process, an image (used paper image) of the printed side of a conveyed document sheet (used paper sheet S0) is read, and in the re-reading process, the print image P3 that is a result of superimposing the superimposition image P2 on the used paper image P1, is read again.

Figure 12:
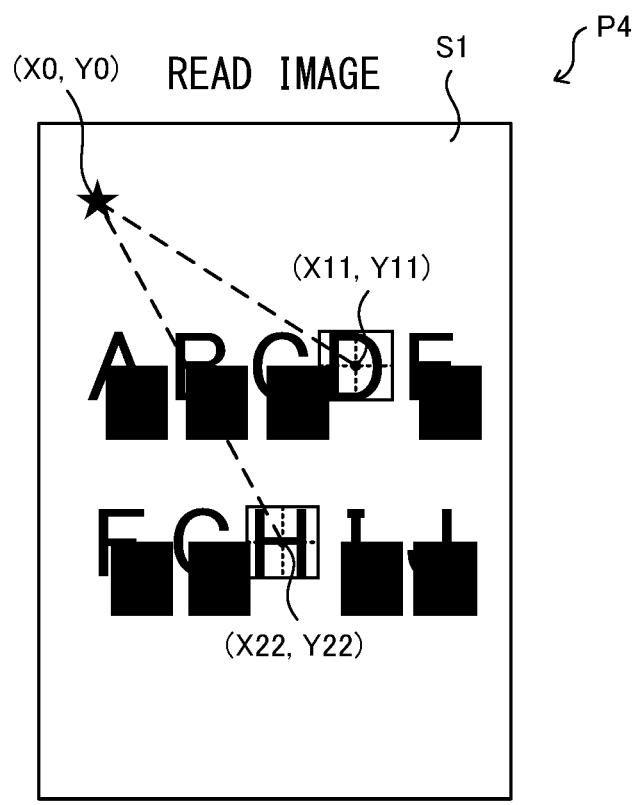
FIG. 12 is a diagram showing an example of a read image read from a printing result obtained when a superimposition image is printed over a used paper image in the image forming apparatus according to the embodiment of the present disclosure.

FIG. 12 shows a read image P4 that has been read in the reading process. Subsequently, the correction processing portion 57 detects a relative position of the specific letter to the specific image in the read image P4. Specifically, as shown in FIG. 12, the correction processing portion 57 detects, in the read image P4, position coordinates (X11, Y11) of the first specific letter "D" and position coordinates (X22, Y22) of the second specific letter "H" using position coordinates (X0, Y0) of the specific image as a reference. Subsequently, the correction processing portion 57 makes a comparison between a position calculated based on the superimposition process and a position calculated based on the read image P4 to calculate a position shift amount (correction amount) that is a difference between the two positions. Specifically, the correction processing portion 57 calculates: a difference (|X1−X11|, |Y1−Y11|) (first correction amount) between position coordinates (X1, Y1) and position coordinates (X11, Y11); and a difference (|X2−

|X22|, |Y2−Y22|) (second correction amount) between position coordinates (X2, Y2) and position coordinates (X22, Y22).

Subsequently, the correction processing portion 57 corrects the position of the specific image based on the correction amount. Specifically, the correction processing portion 57 corrects the position coordinates (X0, Y0) of the black star mark that is the specific image, by a first correction amount that is the difference (|X1−X11|, |Y1−Y11|). In addition, the correction processing portion 57 corrects the position coordinates (X0, Y0) of the black star mark that is the specific image, by a second correction amount that is the difference (|X2−X22|, |Y2−Y22|). It is noted that the correction processing portion 57 may correct the position of the specific image based on both the first specific letter (first correction amount) and the second specific letter (second correction amount), or correct the position of the specific image based on either the first specific letter (first correction amount) or the second specific letter (second correction amount). The correction processing portion 57 stores, in the storage portion 7, information (correction information) of the correction amount of the specific image.

As described above, the correction processing portion 57 executes a correction process to correct the printing position of the superimposition image P2 based on the used paper image P1 and the superimposition image P2 included in the read image P4 of the print image P3 read by the used paper reading portion 33. Specifically, the correction processing portion 57 detects a first position and a second position, wherein the first position is a relative position of the specific letter to the predetermined position when the superimposition image P2 generated by the generation processing portion 55 is virtually superimposed on the used paper image P1, and the second position is a relative position of the specific letter to the predetermined position in the read image P4 of the print image P3 read by the used paper reading portion 33. The correction processing portion 57 then calculates the difference (correction amount) between the first position and the second position. The correction processing portion 57 then corrects the position of the specific image based on the correction amount.

Figure 13:
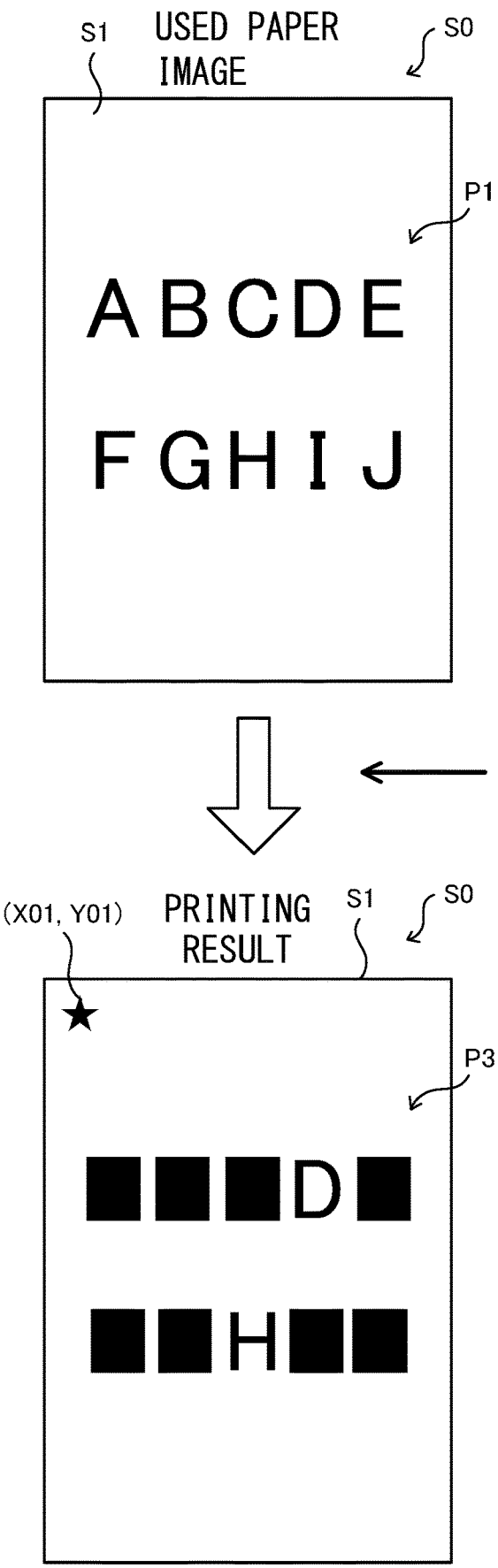
FIG. 13 is a diagram showing a still further example of a printing result obtained when a superimposition image is printed over a used paper image in the image forming apparatus according to the embodiment of the present disclosure.
Figure 13:
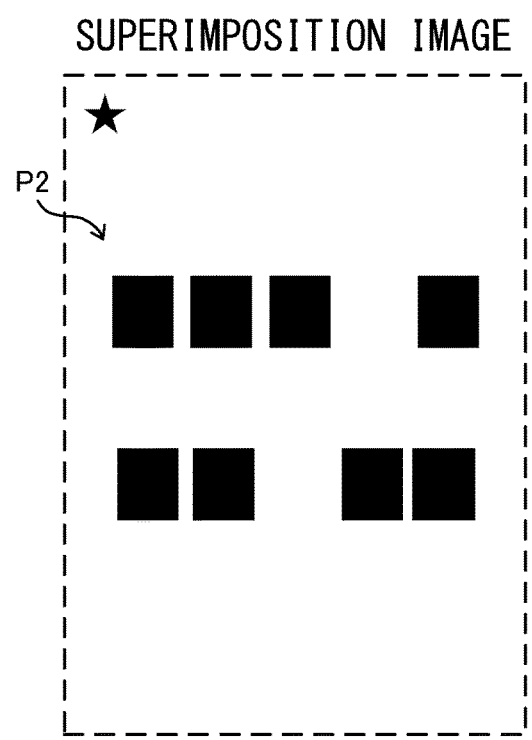

Subsequently, the printing processing portion 56 causes the image forming portion 3 to execute a printing process to superimpose the superimposition image P2 generated by the generation processing portion 55, on the used paper image P1 in the printed side S1 of the used paper sheet S0, based on the corrected position of the specific image. Specifically, the printing processing portion 56 positions the black star mark that is the specific image, to the corrected position indicated by position coordinates (X01, Y01), superimposes the superimposition image P2 on the used paper image P1, and prints the printed side of the used paper sheet. With this configuration, the position of the superimposition image P2 is corrected by an amount corresponding to the correction amount, and as shown in FIG. 13, the superimposition image P2 is superimposed at an appropriate position on the used paper image P1.

The above-described configuration prevents information from being leaked due to a position shift. In addition, with the configuration in which the position of the specific image is corrected based on both the first specific letter (first correction amount) and the second specific letter (second correction amount), it is possible to superimpose the superimposition image P2 on the used paper image P1 in a reliable manner with increased accuracy of correction of the position. It is noted that the first specific letter and the second specific letter are preferably located in different directions when viewed from the specific image. This allows the position shift to be corrected in the horizontal direction, the vertical direction, and an oblique direction.

In the above-described embodiment, the correction processing portion 57 detects a relative position of a specific letter to a specific image. However, in another embodiment, the correction processing portion 57 may detect a relative position of a specific letter to an end portion of a used paper sheet P0. For example, the correction processing portion 57 may detect position coordinates of a specific letter, using a corner portion of the paper sheet as an origin (X0, Y0).

The image forming apparatus 10 may execute the correction process in a predetermined cycle. In addition, the image forming apparatus 10 may monitor the position shift amount (correction amount) continuously, and execute the correction process when the position shift amount has exceeded a predetermined threshold.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:
1. An image forming apparatus comprising:
an image forming portion configured to form an image on a paper sheet, the image forming portion comprising a photoconductor drum, a charging device, and rollers;
an image reading portion configured to read a first image from a printed side of a used paper sheet supplied from a sheet feed portion, the image reading portion comprising a contact glass, a reading unit, mirrors, and a charge coupled device;
a processor; and
a memory storing instructions to be executed by the processor, the instructions comprising:
an analysis processing portion configured to analyze content of the first image read by the image reading portion;
a generation processing portion configured to generate a second image based on the content of the first image analyzed by the analysis processing portion, the second image degrading visibility of the first image when the second image is superimposed on the first image; and
a printing processing portion configured to cause the image forming portion to execute a printing process such that the second image generated by the generation processing portion is superimposed on the first image on the printed side, wherein
the first image represents a character,
the generation processing portion generates the second image that degrades visibility of the character when the second image is superimposed on the first image,
information of the second image is stored in association with information of the first image,
the information of the first image is associated with one or more pieces of information of the second image, and
in a case where a plurality of same first images are included in the printed side, the generation processing portion acquires, from among a plurality of pieces of information of the second image associated with the information of the first image, a piece of information of the second image based on a position at which the first image is disposed in the printed side, and generates the second image based on the acquired piece of information of the second image.

2. The image forming apparatus according to claim 1, wherein
in a case where a plurality of first images are included in the printed side, the generation processing portion generates different second images in correspondence with adjacent first images.

3. The image forming apparatus according to claim 1, wherein
the generation processing portion generates the second image that is same as the first image in at least one of size, color, density, and line width.

4. The image forming apparatus according to claim 1, wherein
the generation processing portion acquires, from among the plurality of pieces of information of the second image associated with the information of the first image, a piece of information of the second image that does not degrade visibility of an image formed on an unused side of the used paper sheet in a state where the second image is printed over the first image, and generates the second image based on the acquired piece of information of the second image.

5. The image forming apparatus according to claim 1, wherein
priorities are respectively set to the plurality of pieces of information of the second image associated with the information of the first image such that the lower the visibility of the first image with a second image superimposed thereon is, the higher the priority of a piece of information of the second image is, and
the generation processing portion acquires, from among the plurality of pieces of information of the second image associated with the information of the first image, a piece of information of the second image such that the higher the level of importance of the first image is, the higher the priority of the acquired piece of information of the second image is, and generates the second image based on the acquired piece of information of the second image.

6. An image forming apparatus comprising:
an image forming portion configured to form an image on a paper sheet, the image forming portion comprising a photoconductor drum, a charging device, and rollers;
an image reading portion configured to read a first image from a printed side of a used paper sheet supplied from a sheet feed portion, the image reading portion comprising a contact glass, a reading unit, mirrors, and a charge coupled device;
a processor; and
a memory storing instructions to be executed by the processor, the instructions comprising:
an analysis processing portion configured to analyze content of the first image read by the image reading portion;
a generation processing portion configured to generate a second image based on the content of the first image analyzed by the analysis processing portion, the second image degrading visibility of the first image when the second image is superimposed on the first image; and
a printing processing portion configured to cause the image forming portion to execute a printing process such that the second image generated by the generation processing portion is superimposed on the first image on the printed side, wherein
the generation processing portion generates the second image such that at least one specific letter among a plurality of letters included in the first image is not superimposed by the second image.

7. The image forming apparatus according to claim 6, wherein
the image reading portion is further configured to read a print image that is resulted when the image forming portion superimposes the second image on the first image.

8. The image forming apparatus according to claim 7, the instructions further comprising:
a correction processing portion configured to execute a correction process to correct a printing position of the second image based on the first image and the second image included in a read image of the print image read by the image reading portion.

9. The image forming apparatus according to claim 8, wherein
the correction processing portion detects a first position and a second position, wherein the first position is a relative position of the specific letter to a predetermined position when the second image generated by the generation processing portion is virtually superimposed on the first image, and the second position is a relative position of the specific letter to the predetermined position in the read image of the print image read by the image reading portion, and corrects the predetermined position based on a difference between the first position and the second position, and
the printing processing portion causes the image forming portion to execute the printing process based on the predetermined position corrected by the correction processing portion.

10. The image forming apparatus according to claim 9, wherein
the generation processing portion generates a specific image at a given position that is not superimposed on the first image, the given position being separated from the second image by a predetermined distance.

11. An image forming method comprising:
an analysis step of analyzing content of a first image read by an image reading portion from a printed side of a used paper sheet supplied from a sheet feed portion;
a generation step of generating a second image based on the content of the first image analyzed in the analysis step, the second image degrading visibility of the first image when the second image is superimposed on the first image; and
a printing step of causing an image forming portion to execute a printing process such that the second image generated in the generation step is superimposed on the first image on the printed side, the image forming portion configured to form an image on a paper sheet, wherein
the first image represents a character,
the second image is generated that degrades visibility of the character when the second image is superimposed on the first image,
information of the second image is stored in association with information of the first image,
the information of the first image is associated with one or more pieces of information of the second image, and
in a case where a plurality of same first images are included in the printed side, the generation step includes acquiring, from among a plurality of pieces of information of the second image associated with the information of the first image, a piece of information of the second image based on a position at which the first image is disposed in the printed side, and generating the second image based on the acquired piece of information of the second image.

\* \* \* \* \*